Aug. 9, 1932.   P. MEYER   1,871,382
PIN DETECTOR FOR BASE FEEDING MECHANISM
Filed Aug. 31, 1929   3 Sheets-Sheet 1
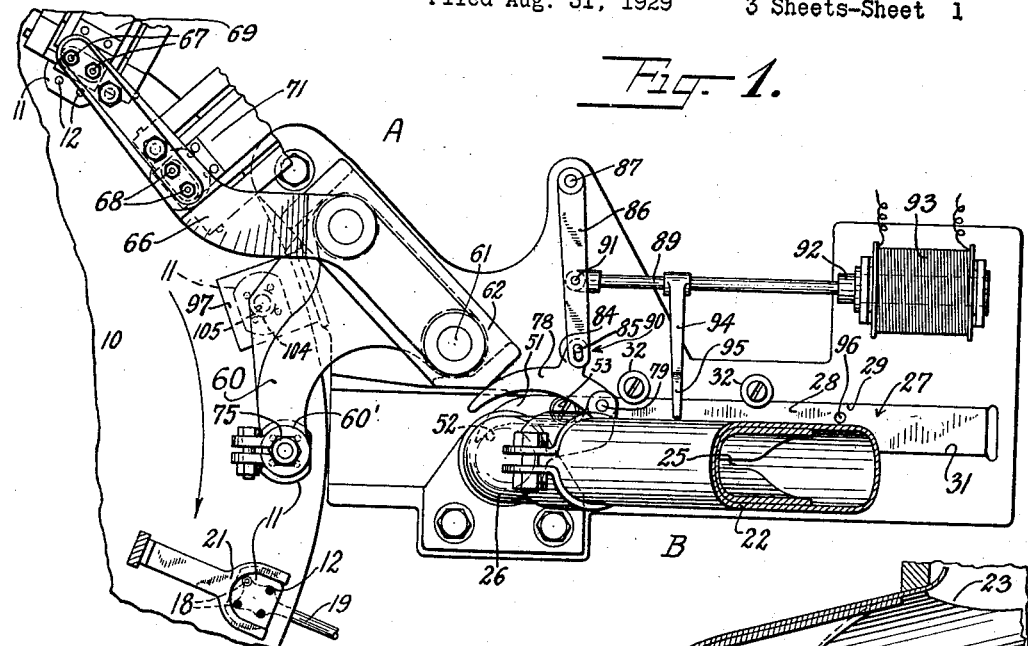
INVENTOR
PETER MEYER
BY
ATTORNEY Aug. 9, 1932.　　　　　P. MEYER　　　　　1,871,382
PIN DETECTOR FOR BASE FEEDING MECHANISM
Filed Aug. 31, 1929　　　3 Sheets-Sheet 2
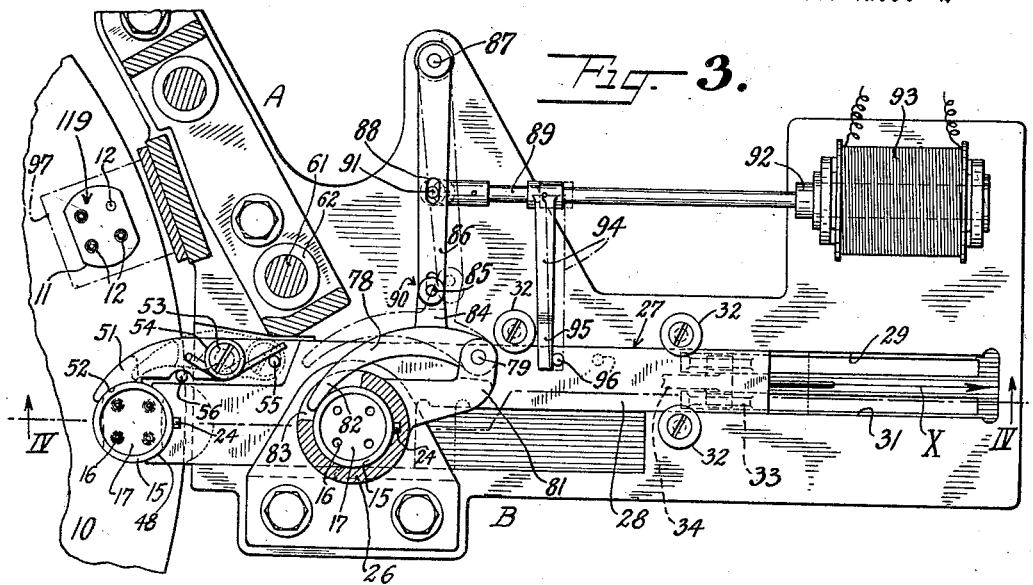
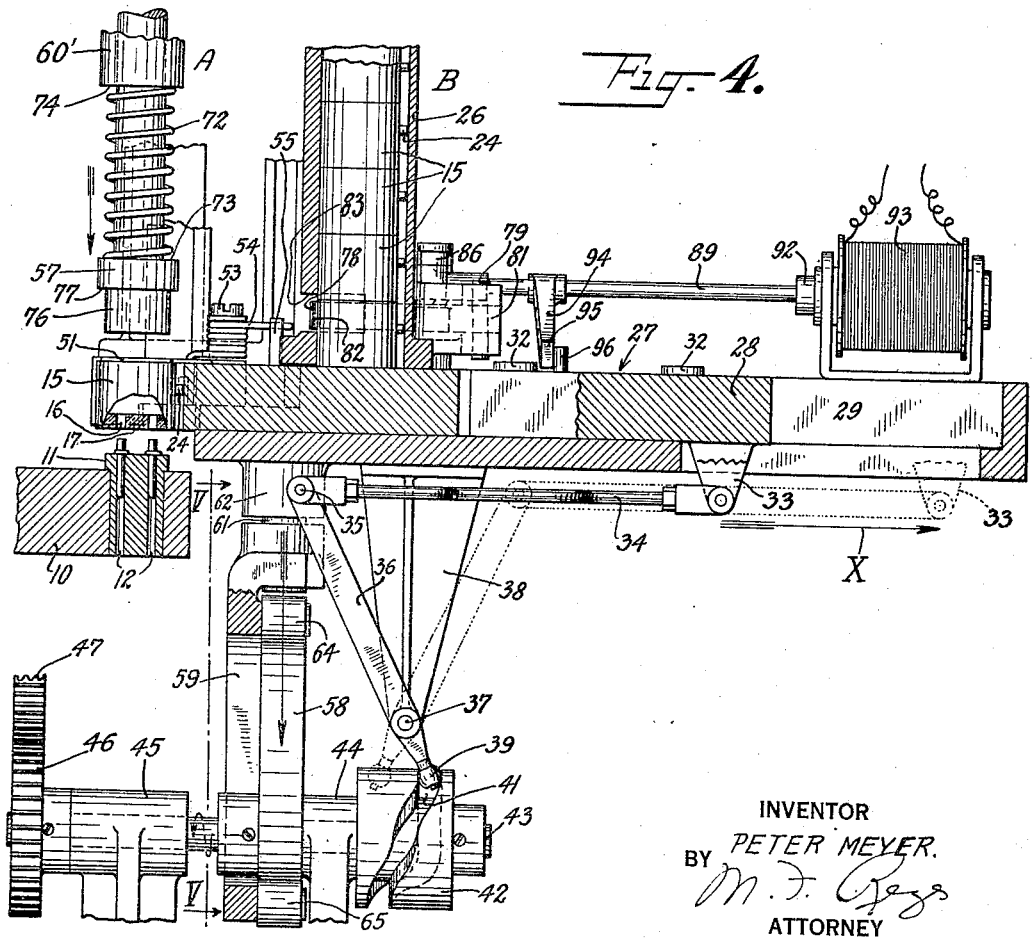
INVENTOR
PETER MEYER.
BY
ATTORNEY

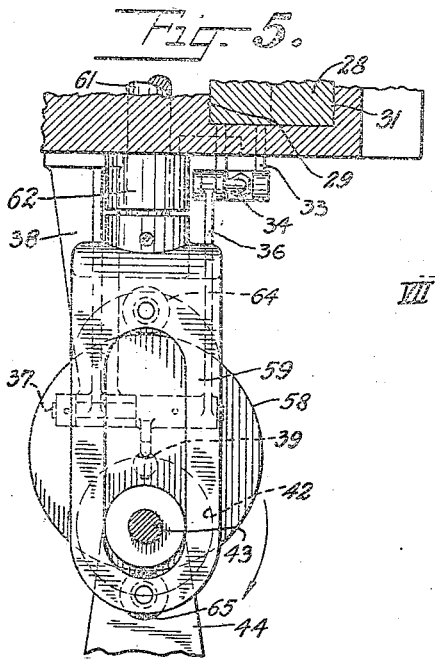
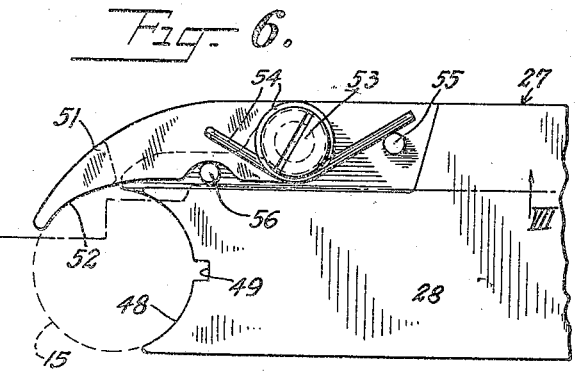
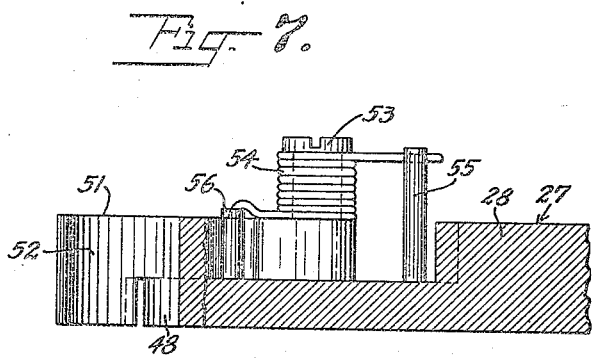
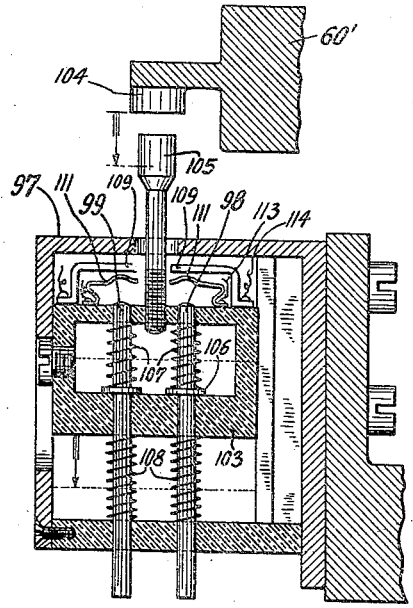
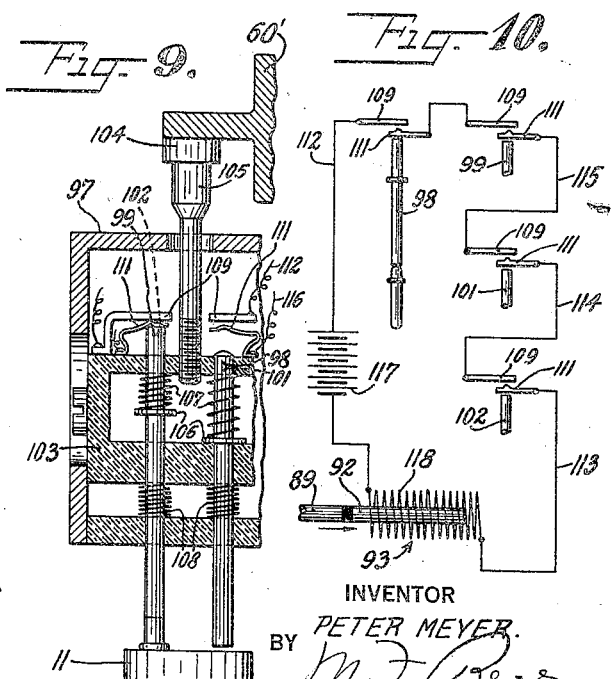

Patented Aug. 9, 1932

1,871,382

UNITED STATES PATENT OFFICE

PETER MEYER, OF NEWARK, NEW JERSEY, ASSIGNOR TO WESTINGHOUSE LAMP COMPANY, A CORPORATION OF PENNSYLVANIA

PIN DETECTOR FOR BASE FEEDING MECHANISM

Application filed August 31, 1929. Serial No. 389,841.

This invention relates to mechanism for feeding bases for radio tubes or the like which include a plurality of metallic contact pins, and to mechanism for preventing the application of an improper number of pins to bases.

In the manufacture of electrical devices, such for example as radio tubes or other similar vacuum devices comprising a bulb, it is necessary to provide the bulb with a base having a plurality of metallic contact elements or pins extending from the bottom wall thereof.

Usually the bases are of cup shape and composed of insulating material, such as a condensite product. These bases are produced by a molding operation and provided with apertures in the bottom wall thereof. The bases are then applied to a machine which automatically secures, by riveting or otherwise, a plurality of metallic contact pins in the apertures provided in the bottom wall of the base. The pins are arranged in a given spaced relation, perpendicular to and extending externally of the said bottom base wall.

A machine for performing what is termed a riveting or staking-in operation for securing the pins to a base is shown more clearly in copending application, Serial No. 362,110 filed May 10, 1929 and assigned to the same assignee as is the present invention.

In the said copending application a rotary or disk conveyor is provided to carry a base progressively in operative relation to mechanisms which automatically position contact pins and secure them in the base walls. The conveyor is provided with sets of apertures or recesses to receive pins, which sets of apertures are disposed in spaced relation around the periphery of the conveyor, which may be rotated intermittently by any suitable mechanism.

Adjacent to the path of movement of the conveyor is provided a plurality of pin feeding mechanisms which automatically deposit contact pins in the sets of apertures provided in the conveyor. The contact pins when positioned in the apertures are so arranged that ends thereof extend upwardly and as the conveyor moves, each set of upwardly extending pins is positioned adjacent to the base feeding mechanism. This base feeding mechanism operates to move bases over a set of positioned pins and to insert the extending ends of the pins into the apertures provided in the bottom walls of the bases. After the bases have been properly positioned with the pin ends extending through the apertures therein, the bases and pins are moved into operative relation with mechanism which automatically rivets or upsets the extending ends of the pins thus securing them to the walls of the bases.

It has been found, however, that when feeding pins to the apertures in the conveyor the pin feeding mechanism may fail to fill all the apertures in which case a base would be finished by having an improper number of pins secured to the bottom wall thereof.

It is essential in a machine of the present character to obtain high speed operation, and in the event that an improper number of pins are positioned these pins and a base thereon will be carried through the machine making it necessary to subsequently carefully inspect the finished bases and discard any having an improper number of pins secured thereto.

It will be appreciated that any added inspection results in an increased cost by reason of a loss of time and that bases having an improper number of pins therein are useless and considerable loss of material results.

An object of the present invention is to provide mechanism for automatically positioning a base in a given position on a conveyor.

Another object of the invention is to move a base through a given path and to adjust the base during movement to receive contact pins.

Another object of the present invention is to provide mechanism wherein the application of a base to an improper number of contact pins in a base wall is avoided.

Another object of the invention is to provide automatic mechanism operating in conjunction with means for feeding bases whereby said feeding means is controlled by the number of pins positioned for application to said base.

Other objects and advantages of the invention will be apparent from the following description together with the accompanying drawings, in which Fig. 1 is a plan view showing a portion of a base feeding mechanism in operative relation to mechanism for detecting an improper number of positioned pins.

Fig. 2 is a side elevational view partly in section showing base feed and pin detector mechanism.

Fig. 3 is an enlarged view taken on line III—III in Fig. 2.

Fig. 4 is a view taken on line IV—IV in Fig. 3.

Fig. 5 is a view taken on line V—V in Fig. 4.

Fig. 6 is a plan view of an end of a slide plate for moving bases to position over contact pins.

Fig. 7 is a view taken on line VII—VII in Fig. 6.

Fig. 8 is a fragmentary view showing mechanism including contact members in position over pins disposed on a conveyor.

Fig. 9 is a view similar to Fig. 8 but showing the contact members in different positions, and Fig. 10 is a wiring diagram showing the relative positions of the various elements and their connection with an electrical circuit.

A practical embodiment of the invention may include a pin detector mechanism A and a base feed mechanism B, disposed adjacent to the path of movement of the periphery of a rotary conveyor 10.

The conveyor 10 may be of circular form and rotatable intermittently by any suitable mechanism (not shown) and may be provided with a plurality of sets 11 of recesses or pockets 12. Each of the sets may include 4 recesses, although a greater or lesser number of recesses may be provided depending upon the character of the device for which a base is to be provided.

The sets of recesses are so spaced that the conveyor will position a set adjacent to the pin detector mechanism A and another set adjacent to the base feed mechanism B. When the sets of recesses 12 reach the mechanism A and B they will be filled with contact pins 14 so positioned that ends thereof extend upwardly ready to receive a base 15, which base is provided with suitably positioned apertures 16 in the bottom wall 17 thereof.

The pin detector mechanism A operates in conjunction with the base feeding mechanism B so that if an improper number of pins occupy the recesses 12 mechanism is actuated to prevent the base feeding mechanism from feeding a base for application to the improper number of pins. If no base is fed the conveyor moves and at its next position the set of recesses 12 containing an improper number of pins is disposed over a plurality of orifices 18 at one end of a pipe 19 which may be connected with a high pressure air line (not shown.) The orifices 18 are so arranged as to be positioned in line with the recesses 12 which extend through the conveyor and provide passages into which air jets from the orifices pass and blow out the contact pins. The blowing operation may be continuous and if a base having the proper number of pins therein is moved over the orifices 18 the base will be engaged by a stop-bar 21 which prevents the base and pins from being dislodged.

Although the detector mechanism operates to detect the number of pins on the conveyor prior to the operation of the base feeding mechanism such operation of the pin detector mechanism is performed in conjunction with the base feed mechanism and the latter will, therefore, be described first.

The said base feeding mechanism may include an inclined guide or chute 22 of tubular form and so proportioned as to provide a sliding fit to bases 15 which may be fed to the chute by hand. As the bases are fed to an open end 23 of the chute the side or bayonet pins 24 of the bases are guided into a slot 25 so that as the bases move by gravity down a vertical portion 26 of the chute they will be rotated or adjusted to such position so that the contact pins of each base will have the same relative position with respect to the recesses 12 which contain contact pins with their ends projecting, the contact pins being fed to bases by suitable pin feeding mechanism above mentioned but not shown.

The pin feeding mechanism is shown generally in the above mentioned copending application and will be made the subject of a separate application.

When the base 15 has reached the lower end of the vertical portion 26 of the chute 22 it will be in position to be moved laterally for the alignment of its apertures with the contact pins extending from the recesses in the conveyor 10.

Means for laterally moving or adjusting the bases may comprise a slide member 27 (see Figs. 3 and 4) comprising a plate 28 movable between guides 29 and 31, the plate 28 being retained by washer-gibs 32. One end of the plate 28 is provided with a bearing bracket 33 in which one end of a link 34 is pivoted, the opposite end of the said link is pivotally attached at 35 with one end of a rocker arm 36 pivoted at 37 in a bearing or hanger 38. The opposite end of the arm 36 is provided with a roller 39 constituting a cam follower disposed in a cam slot 41 of a barrel cam 42. The cam 42 is secured to a shaft 43 journaled in bearings 44 and 45.

The shaft 43 is provided with a gear wheel 46 disposed in mesh with a gear wheel 47 which latter gear wheel may be connected with any suitable source of power, as for example, a motor (not shown).

When a base travels down the vertical guide 26 and the slide plate 28 has moved to its position in the direction of the arrow X, the base will be ready to pass into means provided at the forward end of the slide plate for moving the base to position over a set of contact pins on the conveyor 10.

The forward end of the slide plate is, therefore, provided with base receiving means comprising an arcuate portion 48 (see Fig. 6) having a notch 49 to receive a bayonet pin 24 of a base. For the purpose of tensionally retaining a base in the space provided by the arcuated surface 48 a tension finger 51 is provided. This finger is formed with a surface 52 so as to provide a continuation of the arcuate portion 48 and thus engage the cylindrical wall of a base. The finger 51 is pivotally mounted on a pin 53 and a helical spring 54 having one end in contact with a pin 55 extending from the slide plate 28 and the opposite end secured to the member 51, holds the latter against a stop pin 56 so that the tension member is normally actuated to retain a base in position at the end of the slide plate 28.

When the slide plate 28 is moved to its forward position by a rotation of the cam 42 the base retained by the tension member 51 is disposed with the apertures thereof in alignment with the positioned pins on the conveyor 10. A plunger then moves downwardly forcing the base from its position at the end of the slide-plate 28 and to position on the conveyor at which time the extending ends of the pins enter the apertures in the bottom of the base and extend slightly therethrough ready to be secured by a riveting operation.

The plunger may then be lifted to clear the base as the slide-plate 28, by a movement of the cam 42, is retracted. Inasmuch as the base is held by reason of the disposition of the contact pins in the apertures thereof a backward movement of the slide-plate will cause the tension member to slip over the side of the base as the slide-plate returns to its retracted position.

It will be noted that with each forward movement of the slide-plate one base is removed from the guide or chute 26 and when the slide-plate is in its forward position it serves as a stop to prevent the downward movement of bases in the chute. A reverse movement of the slide-plate will again position the base receiving means in position to receive a base for movement over another set of positioned pins. The plunger 57 which acts to move a base from the slide-plate may be actuated through motion transmitted from shaft 43. As shown the shaft 43 is provided with a cam 58 which actuates a yoke 59 at the lower end of a lifter rod 61 which lifter rod is movable in guide bearings 62 and 63.

The yoke 59 may be provided with upper and lower contact rollers 64 and 65 respectively, so that a rotation of the shaft 43 will cause the cam 58 to reciprocate the lifter rod 61.

The plunger 57 is attached to the lifter rod 61 by means of an arm 60. One end of the arm 60 may be clamped to the lifter rod and the opposite end may be integral with a housing or guide bearing 60' for the plunger 57. The lifter rod 61 is also provided with a carrier arm which reciprocates pairs of plungers 67 and 68. These plungers operate to insert contact pins into the recesses 12 in the conveyor.

The mechanism for feeding pins is indicated at 69 and 71. No further description of the pin feeding mechanism is given, however, inasmuch as the present invention is directed to the application of a base over positioned members irrespective of the mechanism employed for positioning the members.

The plunger 57 is provided with a helical spring 72 disposed between a shoulder 73 on the plunger and the lower end 74 of the guide bearing 60', the plunger being free to move within the guide bearing which is limited in its downward movement by lock nuts 75 which engage the upper end of the guide bearing 60'. When the lifter rod 61 brings the plunger down to press a base upon the contact pins the action is semi-positive by reason of the spring 72.

The end of the plunger 57 is provided with a reduced portion 76 so positioned as to enter a base and is provided with a flange 77 which engages the upper edge of the base to force it downwardly and cause the contact pins to enter the provided apertures.

The foregoing description sets forth means for guiding bases to predetermined positions and means for advancing the bases to position over sets of contact pins in combination with means for moving the bases so as to dispose the contact pins in the apertures provided in the base walls.

As above pointed out it may happen that a set of pin receiving recesses may contain only 3 or a lesser number of pins than required. The present invention therefore also includes mechanism whereby an improper number of pins may be detected and the feeding of a base prevented thus avoiding the operation of securing an improper number of pins in a base wall.

Mechanism for accomplishing the above may comprise a stop-finger 78 (see Figs. 1 and 3) pivoted at 79 in a bearing 81 integral with the lower end of the chute 22. The stop finger 78 is so positioned that an end 82 thereof will enter a slot 83 adjacent to the lower end of the vertical portion 26 of the chute 22 and engage a base about to pass from the chute and hold the same in position against downward movement.

The stop finger 78 is arranged to normally engage the lowermost base and is actuated to release the base only when the set of recesses moved to what may be termed the detector station, contains the proper number of pins and is ready to be moved to position for the application of a base and if recesses contain an improper number of pins no base will be applied thereto when such pins reach what may be termed the base feeding station.

The stop finger 78 is provided with a projection 84 having a pivot 85 disposed in a slot at one end of a rocker arm 86, the opposite end of which is pivoted at 87 to a stationary portion of the machine.

The arm 86 is provided with a slot 88 intermediate the pivoted points 85 and 87 and one end of a push-rod 89 is provided with a pin 91 disposed in the slot 88. The push-rod 89 is connected with an armature 92 of an electro-magnet or solenoid 93. The pivotal connection between the arm 86 and the projection 84 is such as to provide a toggle joint 90 which when straightened remains locked to hold the finger 78 in contact with a base.

Extending from the push rod 89 is a contact arm 94 having an end 95 disposed in a path of movement of a contact pin 96 projecting upwardly from the slide-plate 28. When the slide plate advances the contact pin 96 engages the arm 94 causing the link 86 to actuate the push finger 78 and engage a lowermost base.

Means are provided for removing the stop finger 78 whenever the conveyor 10 disposes a complete set of pins in position to receive a base. Mechanism constituting the last mentioned means may comprise a contact box 97 (see Figs. 8, 9 and 10) having, in the present construction, four detector contacts 98, 99, 101 and 102.

These contacts are carried in a head 103 movable in the box 97. The lower ends of the contacts extend through the lower wall of the box which box is so positioned as to be engaged by a presser member 104 which member may be integral with and extend from the guide bearing 60' so that with each downward movement of the plunger 57 the presser member will engage a projection 105 secured to and extending from the head 103.

The contact members 98, 99, 101 and 102 are provided with flanges 106 and helical springs 107 contacting with a portion of the head 103 and the flanges 106 normally hold the contact members in their lower positions while springs 108 disposed between the head and the lower wall of the box 97 normally urge the head to an upper position. On the upper portion of the head 103 and adjacent to each of the contact members is a stationary conductor 109 and a spring conductor 111. The spring conductor is arranged so that when a contact member moves upwardly the said spring conductor will be engaged and moved into contact with the stationary conductor 109.

As shown in the diagram in Fig. 10 the stationary conductors and the resilient conductors are connected in series by electrical connections 112, 113, 114, 115 and 116. The connection 112 leads to a battery or other source of electrical energy 117 which is connected to one end of a coil 118 of the solenoid 93. The opposite end of the coil 118 connects with conductor 113. The armature 92 of the solenoid is, as above described, connected with push rod 89.

As above described when the slide-plate 28 moves forward the contact pin 96 engages the arm 94 and the stop finger 78 holds the lowermost base from further movement. It will be understood that the slide-plate 28 has already moved a base to position over four properly positioned pins and that the lowermost base above referred to will be then held from further movement by the slide-plate.

Just prior to a return movement of the slide-plate 28 the cam 58 operates to move the plunger 57 into engagement with the base and as the slide plate 28 begins its return movement the plunger 57 moves downwardly. As the plunger moves, the contact box 97 is also given a downward movement by reason of an engagement between the member 104 and the projection 105 so that the next set of pins in a set of apertures indicated in Fig. 3 by the reference numeral 119 will be engaged by the detector conductors 98, 99, 101 and 102.

If it happens, as shown in set of apertures 119, that one pin is missing then one of the pin detector contacts will fail to close the circuit and no energy will flow through the solenoid 93 thus leaving the stop-finger 78, by reason of the toggle joint 90, in position to prevent a base from dropping between the arcuate surface 48 and the tension finger 52 as the slide-plate 28 is retracted. Thus the improper number of pins will pass without having a base applied thereto and will be ejected by means of the air jets hereinbefore described.

If the proper number of pins are disposed in the recesses a downward movement of the box 97 will cause the detector contacts to be moved and completely close the circuit. At this point in the operation of the machine the slide-plate 28 will be on its return movement and the contact pin 96 will be in the position shown in dotted lines, thus permitting the solenoid to operate and retract the push rod 89 causing the stop finger 78 to move from contact with the base and take the position as indicated in dotted lines.

When a complete set of contact pins is moved to position adjacent to the base feeding mechanism a base will be fed which base with pins therein may be moved to another position for the subsequent operation of securing the pins in the base wall. From the foregoing it will be evident that the present machine operates to automatically feed hollow shell like articles such as radio tube bases and so adjust the bases as to position them to receive the ends of contact pins in suitably provided apertures and that furthermore the mechanism operates in conjunction with the base feeding mechanism whereby the operation of the said mechanism is determined by a given number of positioned pins.

Although a preferred embodiment of the invention is shown and described herein it is to be understood that modifications may be made therein without departing from the spirit and scope of the invention as set forth in the appended claims.

What is claimed is:

1. A machine for applying contact pins to bases comprising a support for a pin, base feeding mechanism electrically operated means controlling said feeding means, and means operable upon engagement with a positioned pin for effecting an actuation of said electrically operated means to actuate said base feeding mechanism.

2. A machine for applying radio bases to positioned contact pins comprising means for supporting a plurality of pins, base feeding mechanism, mechanism controlling the operation of said base feeding mechanism, and means engageable with positioned pins for actuating said last mentioned mechanism to cause an operation of said base feeding mechanism.

3. A machine for applying contact pins to bases comprising, base feeding mechanism, an electrical circuit, electrically operable mechanism controlling said base feeding mechanism, contact members for closing said circuit to actuate said electrically operable mechanism, and means for moving said contact members for engagement with positioned pins to close said circuit and effect an operation of said base feeding mechanism.

4. A machine for applying contact pins to bases comprising, base feeding mechanism, an electrical circuit, a solenoid in said circuit and having a movable armature, means on said armature for preventing an actuation of said feeding mechanism in the absence of a flow of current through said solenoid, a plurality of contacts for closing said circuit, and means for engaging said contacts with said positioned pins to cause a current flow and actuate said armature for the actuation of said base feeding mechanism.

5. In combination a base feeding mechanism, electrically controlled means for actuating said mechanism, an electrical circuit for said means, a support for a group of pins to be positioned in operative relation to said base feeding mechanisms, a contact device in said circuit operable to cause a flow of current to actuate said base feeding mechanisms when engaged by a given number of contact pins, and means for actuating said device to engage said pins.

6. In combination a base feeding mechanism, a normally open electrical circuit, electrically operable means in said circuit for operating said mechanism, means for supporting a group of pins to be applied to a base, a contact device in said circuit for controlling said first mentioned means, a plurality of contacts arranged to close said circuit when engaged by predetermined number of pins, and means for moving said device to engage said pins.

7. In combination, a base feeding mechanism, an electrical circuit, means for actuating said mechanism upon a flow of electrical energy in said circuit, means for supporting a pin to be applied to a base, and means operable upon engagement with said pin for causing a flow of electrical energy in said circuit.

8. In combination, a base feeding mechanism, an electrical circuit, means for actuating said mechanism upon a flow of electrical energy in said circuit, means for supporting a given number of pins to be applied to a base, and means operable upon engagement with a given number of said pins for causing a flow of electrical energy in said circuit.

9. In combination, a base feeding mechanism, an electrical circuit, a solenoid in said circuit, means operable upon a movement of the armature of said solenoid for rendering said base feeding mechanism inoperative, means for supporting a pin to be applied to a base, and means operable upon engagement with said pin for causing a flow of electrical energy in said circuit to cause a movement of said armature.

10. A machine of the class described comprising means for holding a base having a given number of apertures to receive contact pins, means for supporting a given number of pins, base feeding means, and means controlled by the supported pins for actuating said base feeding means.

11. A machine for adjusting and delivering bases comprising gravity means for feeding a base to a given position, means for adjusting a base during its travel in said gravity means, base delivering means, means for actuating said delivery means to move an adjusted base to a given position, and means for removing a base from said delivery means.

In testimony whereof, I have hereunto subscribed my name this 29th day of August, 1929.

PETER MEYER.